United States Patent [19]
Matsuoka et al.

[11] Patent Number: 5,848,530
[45] Date of Patent: Dec. 15, 1998

[54] DEVICE FOR DETECTING DETERIORATION OF CATALYTIC CONVERTER FOR CLEANING EXHAUST GASES

[75] Inventors: Hiroki Matsuoka; Masaaki Tanaka; Sigemitu Iisaka; Michio Furuhashi; Toshinari Nagai; Tadayuki Nagai; Takashi Kawai; Kenji Harima; Yuichi Goto, all of Shizuoka, Japan

[73] Assignee: Toyota Jidosha Kabushiki Kaisha, Toyota, Japan

[21] Appl. No.: 783,229

[22] Filed: Jan. 14, 1997

[30] Foreign Application Priority Data

Jan. 18, 1996 [JP] Japan .................................. 8-006742

[51] Int. Cl.⁶ ...................................................... F01N 3/00
[52] U.S. Cl. .............................................. 60/277; 60/286
[58] Field of Search ........................... 60/277, 284, 286, 60/300

[56] References Cited

U.S. PATENT DOCUMENTS

| | | | |
|---|---|---|---|
| 4,974,414 | 12/1990 | Kono et al. ........................... | 60/286 |
| 5,191,763 | 3/1993 | Yuuki . | |
| 5,261,230 | 11/1993 | Yuuki et al. ........................... | 60/286 X |
| 5,428,955 | 7/1995 | Yuuki et al. ........................... | 60/286 X |
| 5,553,451 | 9/1996 | Harada ................................... | 60/277 |

FOREIGN PATENT DOCUMENTS

| | | |
|---|---|---|
| B2-57-2896 | 1/1982 | Japan . |
| A-3-249320 | 11/1991 | Japan . |
| A-6-307233 | 11/1994 | Japan . |

*Primary Examiner*—John E. Ryznic
*Attorney, Agent, or Firm*—Oliff & Berridge, PLC

[57] ABSTRACT

A device for detecting deterioration of a catalyst in an internal combustion engine having a heater on the upstream side of a catalytic converter provided in an exhaust gas passage, the device being capable of expanding the deterioration determination conditions of the catalyst. It is determined whether the conditions, except the temperature condition, are all obtained among the conditions for detecting deterioration of the catalytic converter. When the conditions, except the temperature condition, are all obtained, an electric power is supplied from a power source to the heater to satisfy the temperature condition. Deterioration of the catalyst can be reliably detected if the electric power is supplied to the heater only when the engine is in the idling operation condition and if deterioration of the catalyst is detected when the time for supplying electric power to the heater has become larger than a predetermined period of time. The heater may be one contained in the electrically heated catalyst.

9 Claims, 14 Drawing Sheets

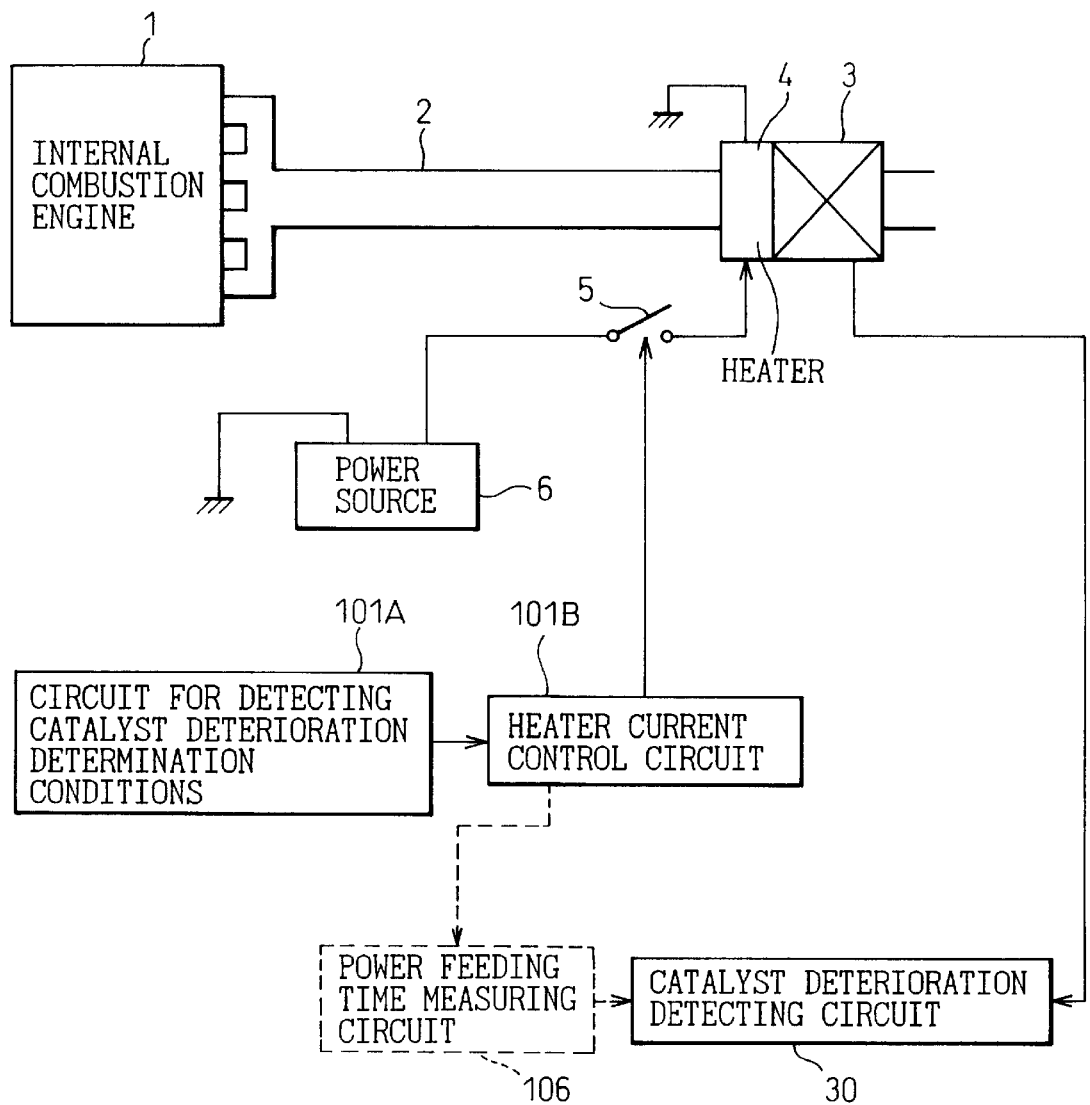

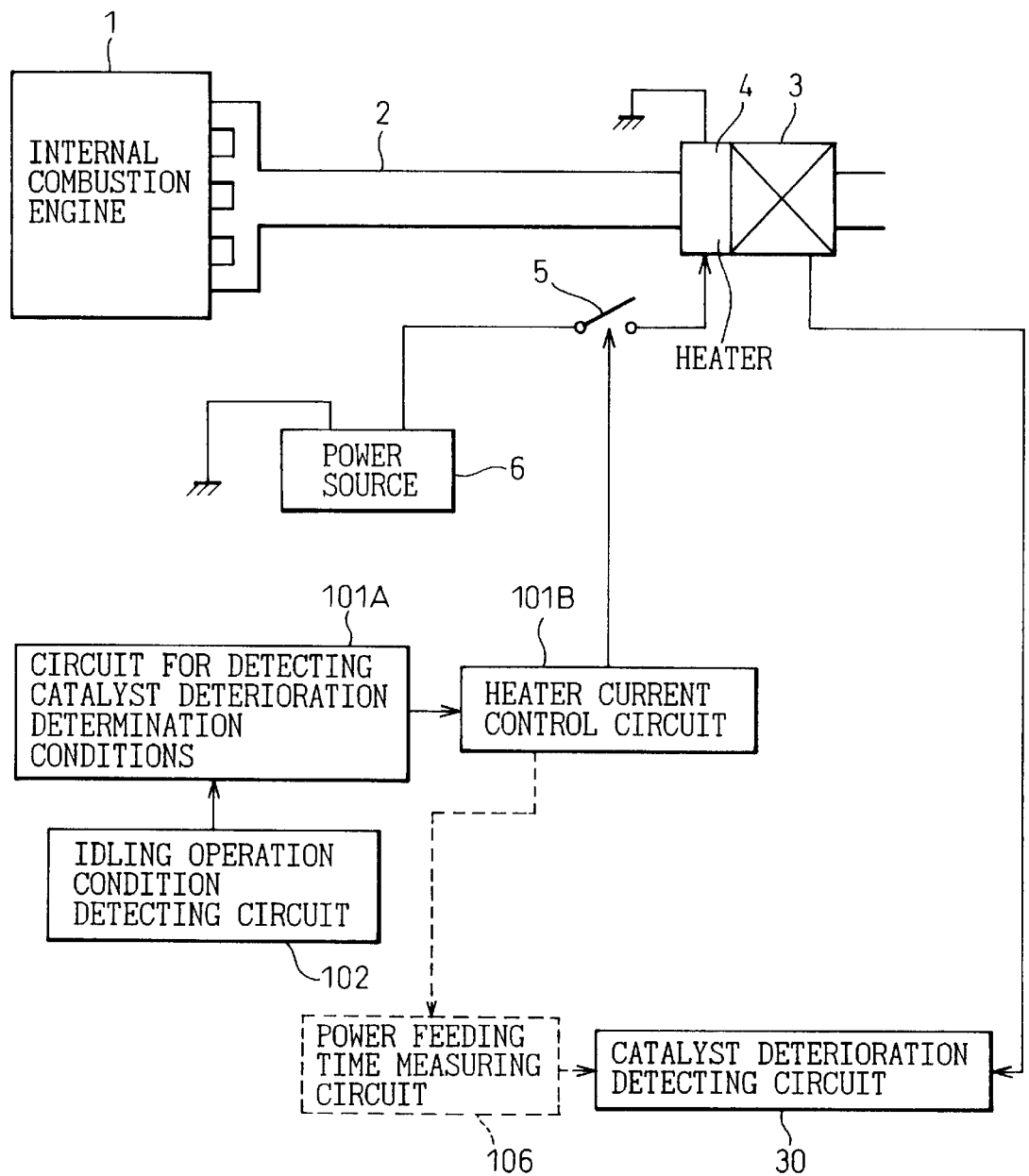

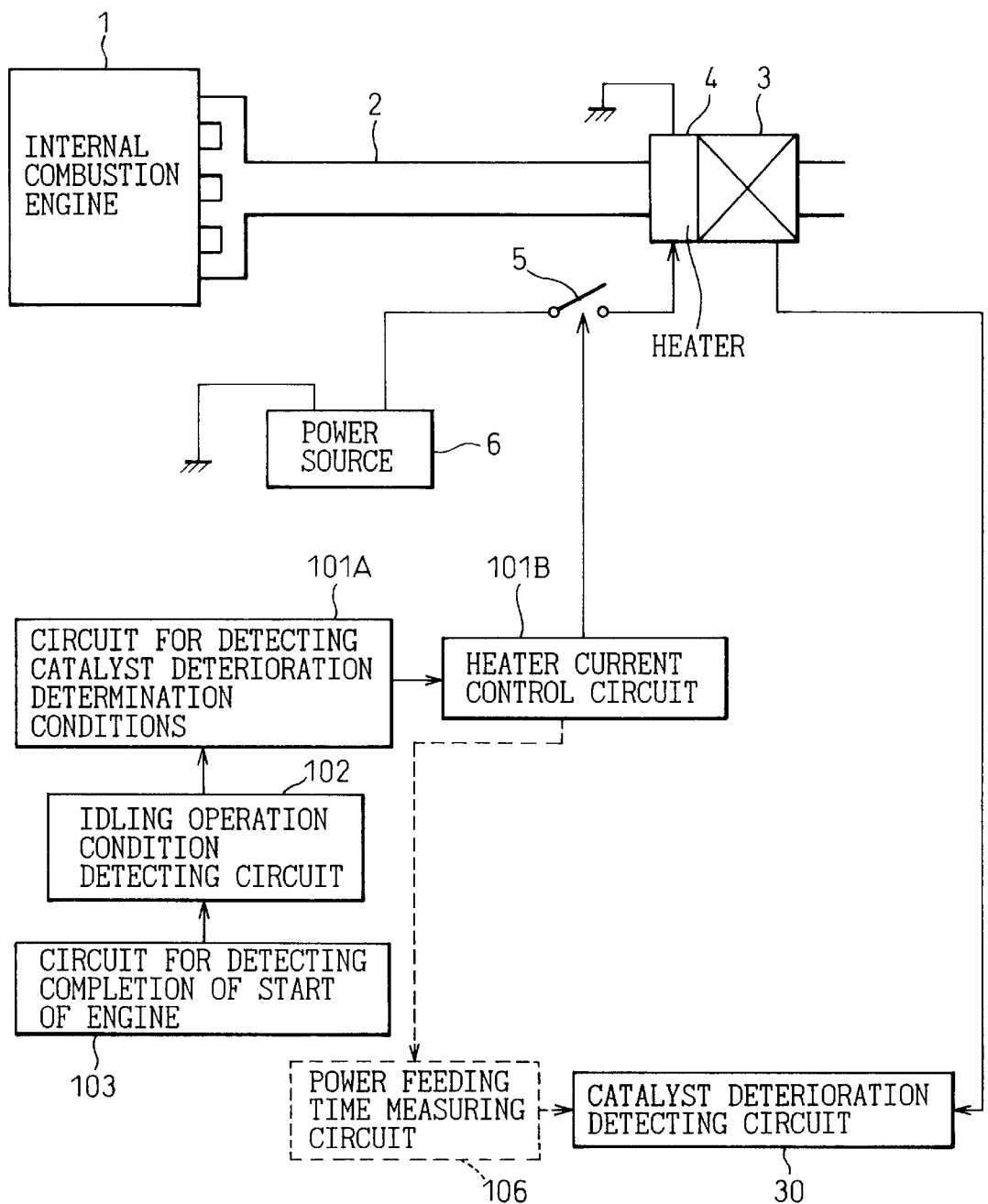

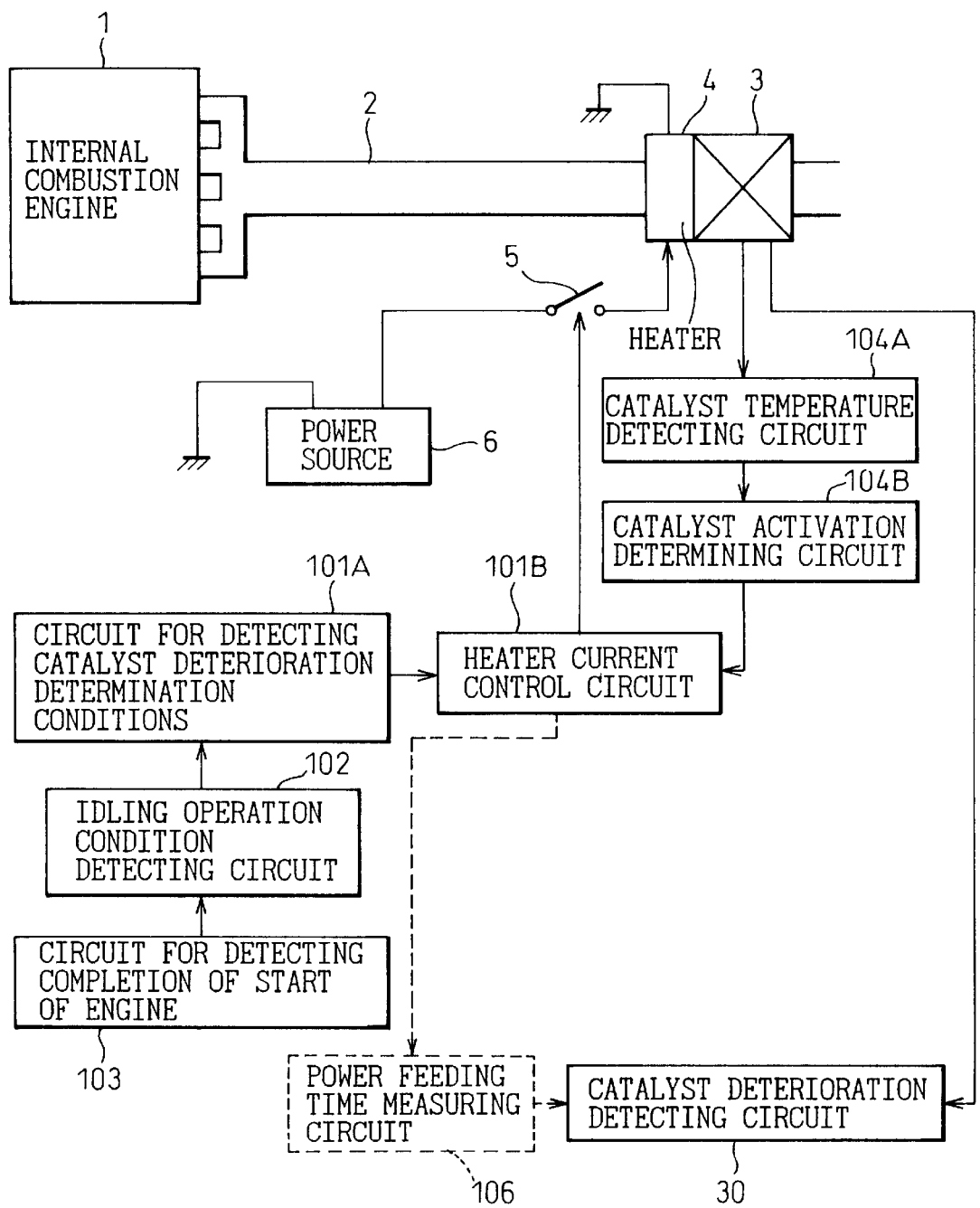

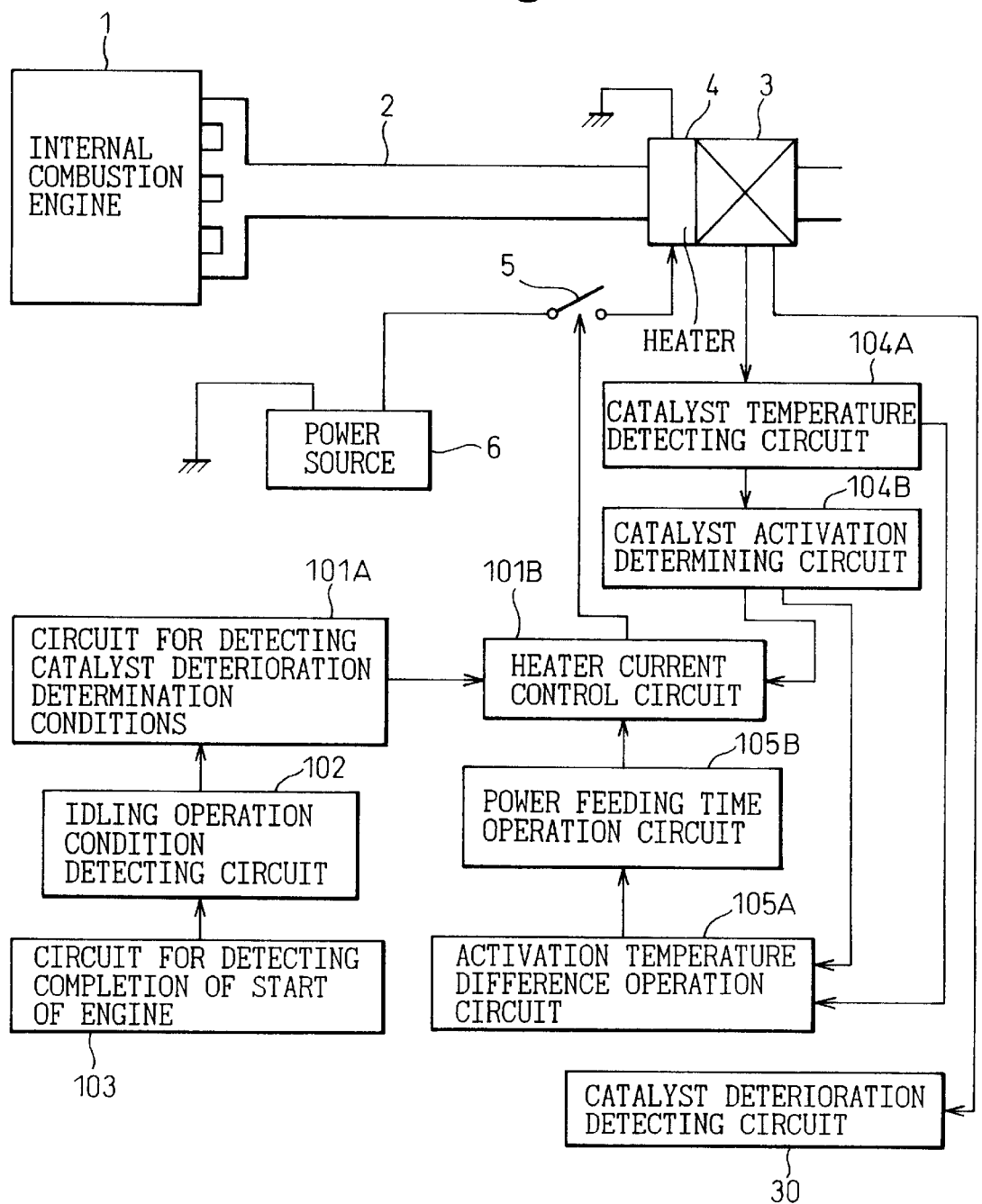

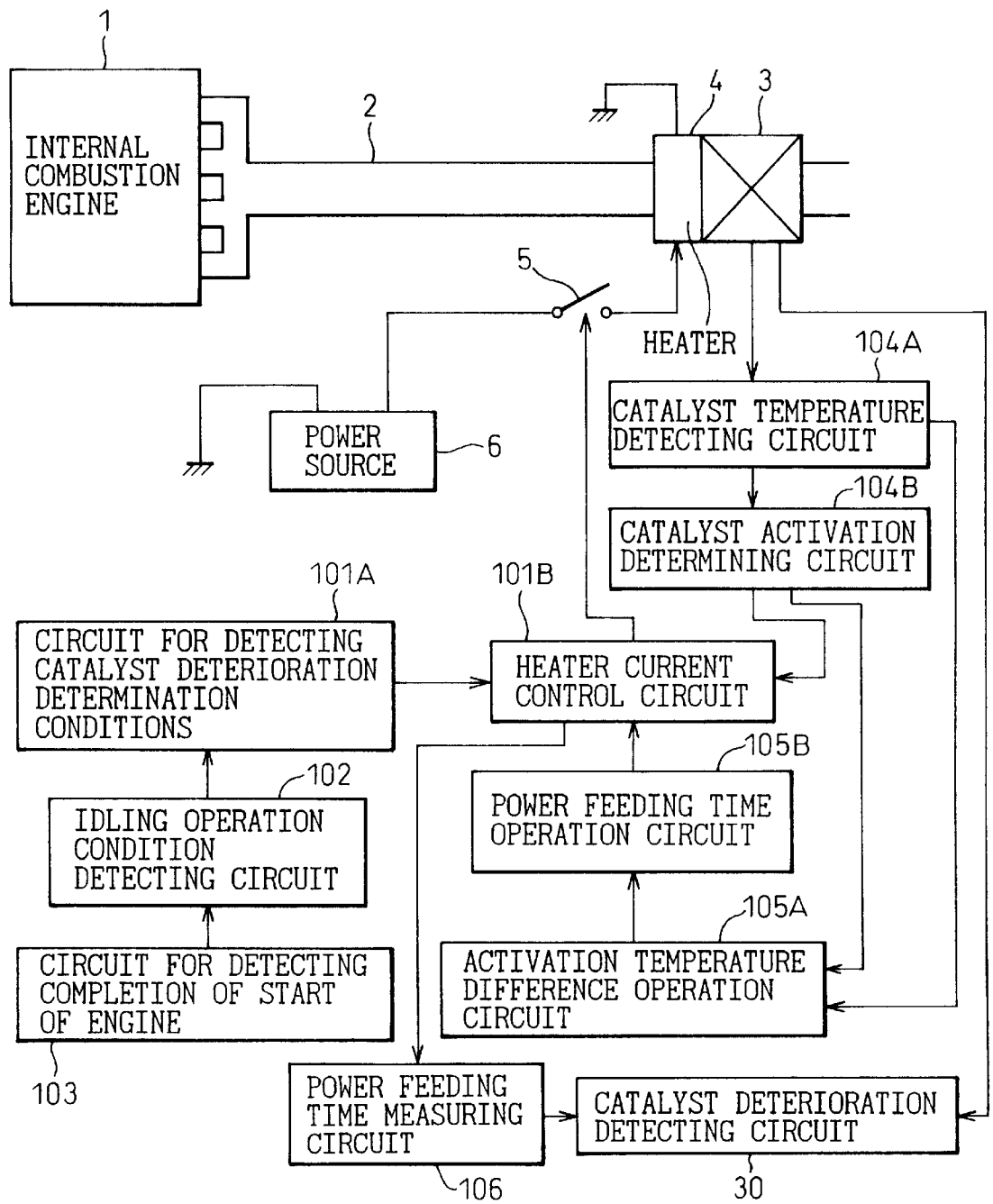

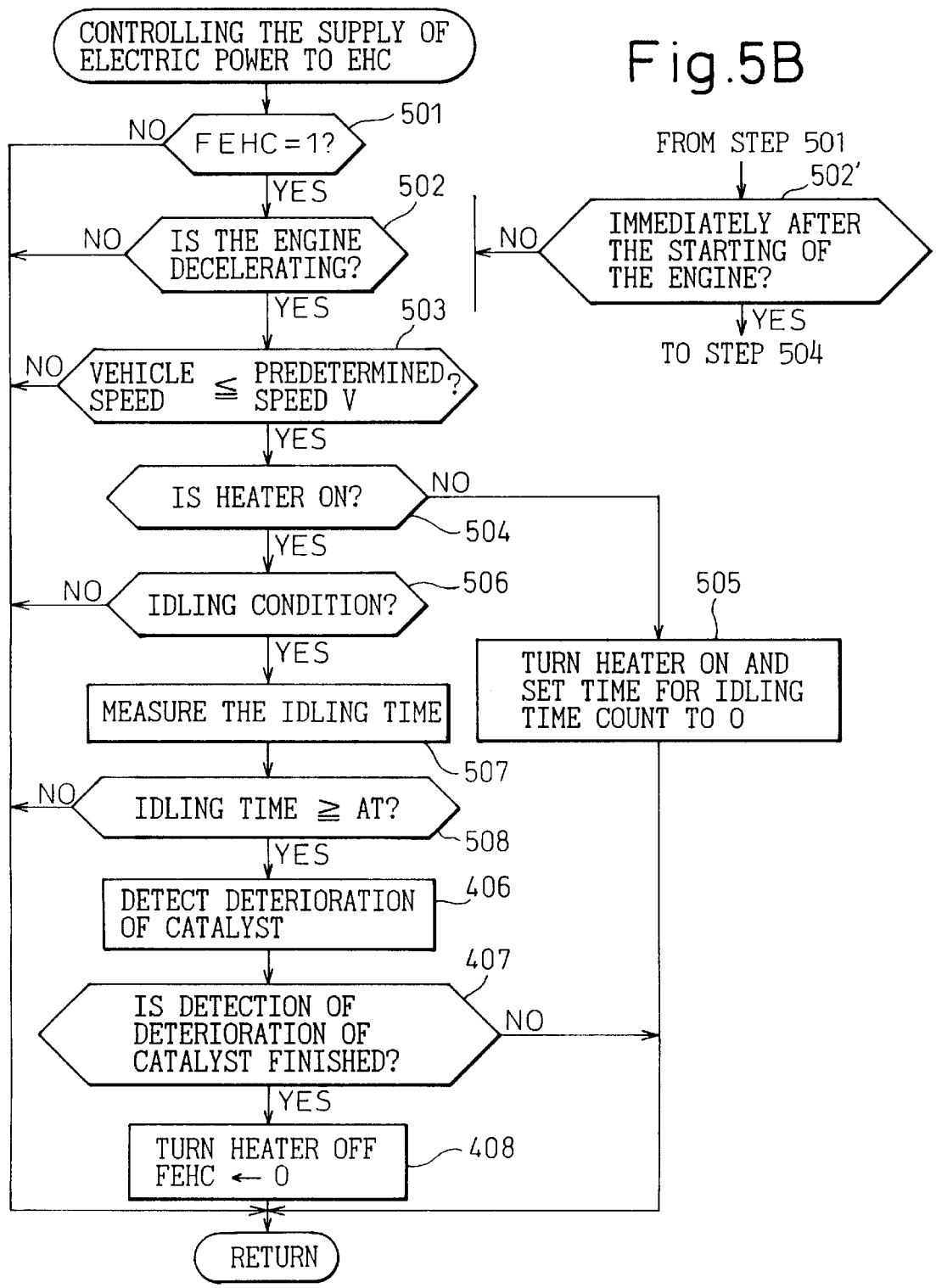

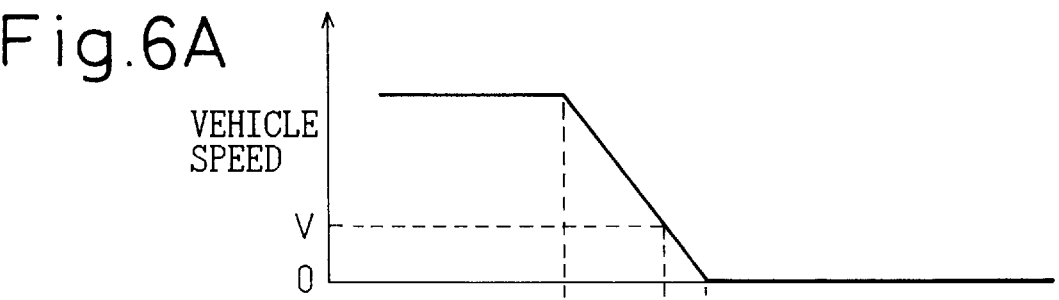
Fig.6A VEHICLE SPEED
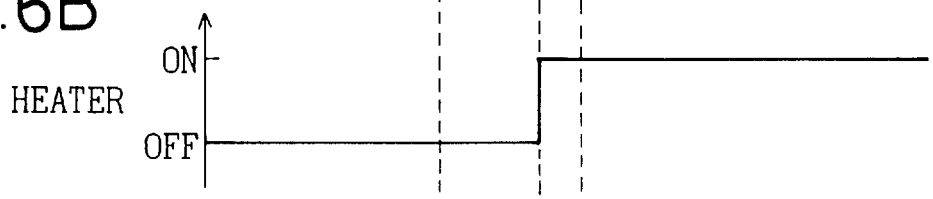
Fig.6B HEATER
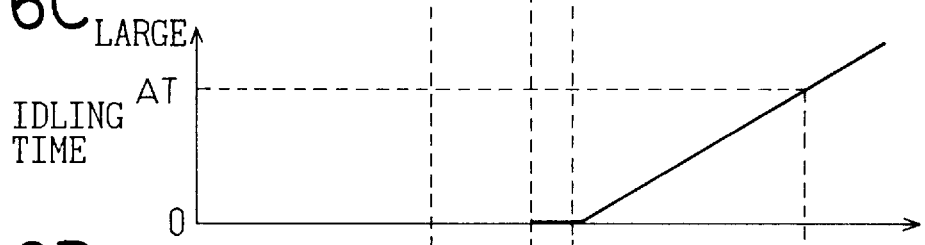
Fig.6C IDLING TIME
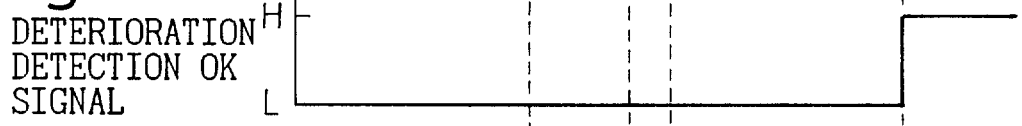
Fig.6D DETERIORATION DETECTION OK SIGNAL
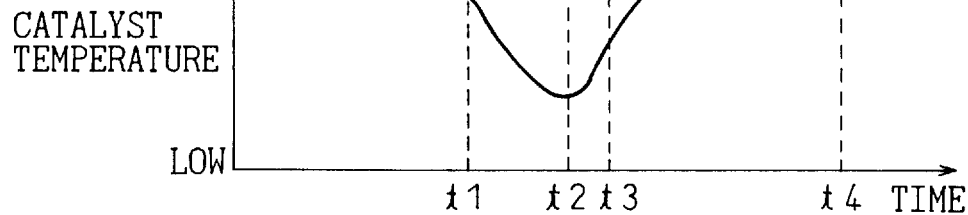
Fig.6E CATALYST TEMPERATURE

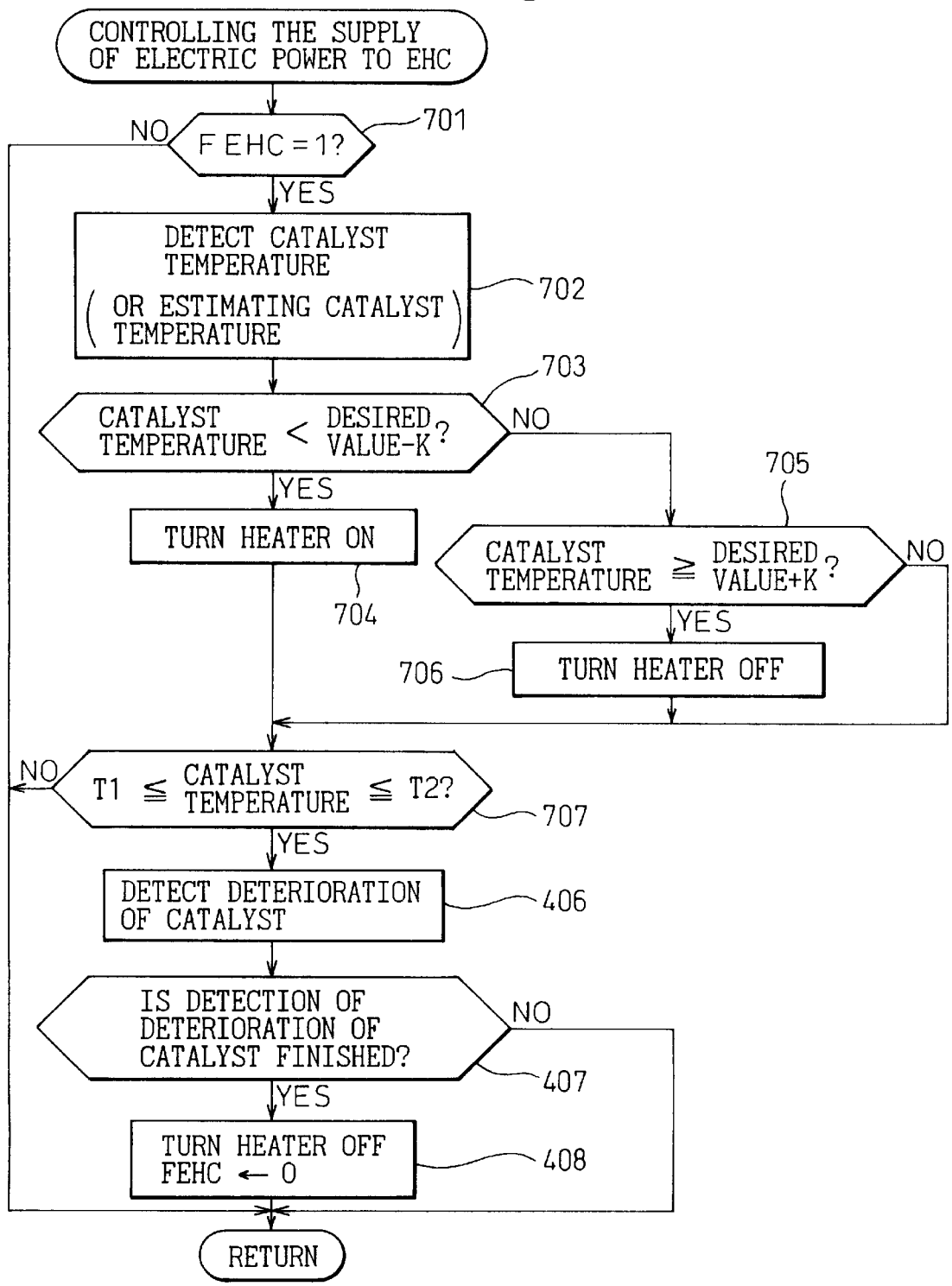

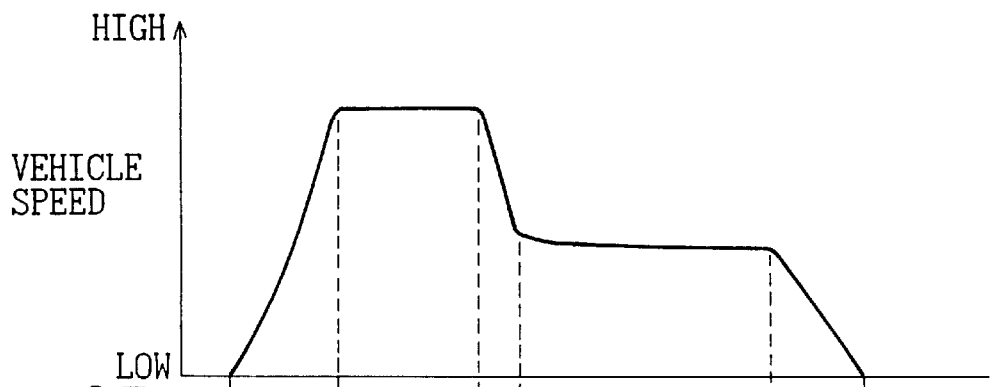
Fig.8A
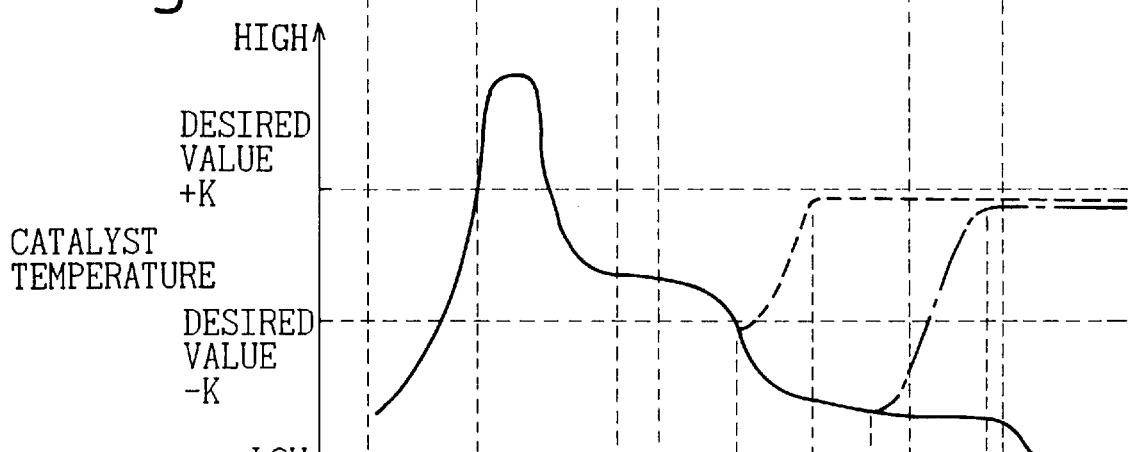
Fig.8B
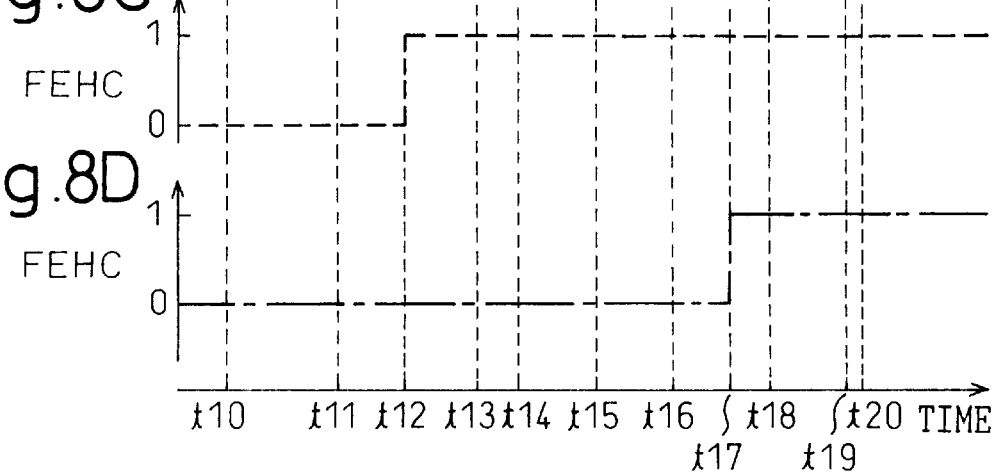
Fig.8C
Fig.8D

DEVICE FOR DETECTING DETERIORATION OF CATALYTIC CONVERTER FOR CLEANING EXHAUST GASES

BACKGROUND OF THE INVENTION

1. Field of the Invention

The present invention relates to a device for detecting deterioration of a catalytic converter. More specifically the invention relates to a device for detecting deterioration of a catalytic converter which, at the time of detecting deterioration of the at least one catalytic converter attached to the exhaust gas passage of an internal combustion engine to clean the exhaust gases, supplies electric power to an electric heater provided on the upstream side of the catalytic converter in order to expand the range of deterioration detection conditions for the catalytic converter.

2. Description of the Related Art

Exhaust gases emitted from an internal combustion engine of a vehicle contain such harmful substances as HC (hydrocarbons), CO (carbon monoxide) and NOx (nitrogen oxides). In an exhaust gas passage of an internal combustion engine there is usually provided a catalytic converter which is a device for removing impurities contained in the exhaust gases. However, it has been known that when the temperature of the catalyst is low (in an inactive state), the three-way catalyst used in the catalytic converter works to remove only some of the harmful substances contained in the exhaust gases. Therefore, when the catalytic converter is in the inactive state after cold starting of the internal combustion engine, the exhaust gases cannot be cleaned to a sufficient degree.

There has been proposed a device for cleaning exhaust gases which is installed in the exhaust gas passage on the upstream side of the catalytic converter, the device incorporating an electrically heated second catalytic converter (EHC: electrically heated catalyst) carrying an oxidizing catalyst or a three-way catalyst and having an electric heater, so that when the catalytic converter is still inactive, the second catalytic converter (hereinafter referred to as the electrically heated catalyst) is electrically heated to activate the oxidizing catalyst or the three-way catalyst and to promote the removal of harmful substances.

After being used for extended periods of time, however, the catalyst carrier in the catalytic converter loses its cleaning efficiency and becomes no longer capable of cleaning the exhaust gases to a sufficient degree. When the internal combustion engine is operated under defective conditions such as causing misfire, furthermore, the catalytic converter may lose its cleaning efficiency even within a short period of time.

In recent years, therefore, various devices have been proposed for diagnosing the degree of deterioration of the catalytic converters.

For example, Japanese Unexamined Patent Publication (Kokai) No. 6-307233 discloses a system for improving precision in the diagnosis of deterioration of the catalyst without increasing the cost. According to this system, the operation condition of the engine is estimated based upon the amount of intake air used by the engine, the rotational speed of the engine and the amount of fuel injection, and the catalyst temperature is estimated by finding the amount of heat which the catalytic converter receives from the exhaust gases under the operation condition of the engine. The estimated catalyst temperature is compared with a reference value which represents the catalyst activation temperature region. When the estimated temperature deviates from the reference value, no operation is carried out for determining deterioration of the catalytic converter, so that deterioration of the catalytic converter will not be erroneously determined.

In the system for diagnosing deterioration of the catalyst disclosed in Japanese Unexamined Patent Publication (Kokai) No. 6-307233, however, activation of the catalyst is determined by estimating the catalyst temperature. Therefore, erroneous determination may result if the precision of estimation is poor. Besides, since deterioration of the catalytic converter is determined when the catalyst is activated by the heat of the exhaust gases, a limitation is imposed on the number of times for determining deterioration of the catalytic converter.

SUMMARY OF THE INVENTION

It is therefore an object of the present invention to provide a device for detecting deterioration of a catalytic converter equipped with an electric heater on the upstream side thereof attached to an exhaust gas passage, in an internal combustion engine wherein, in determining the deterioration of the catalytic converter, the electric power is supplied to the electric heater in order to reliably activate the catalyst, so that deterioration of the catalytic converter is precisely determined without being hindered by the temperature conditions.

In order to accomplish the above-mentioned object, the present invention deals with a device for detecting deterioration of a catalyst in an exhaust gas cleaning system which comprises at least one catalytic converter provided in the exhaust gas passage of an internal combustion engine, and an electric heater for heating the catalyst carrier in the catalytic converter, wherein it is determined whether the conditions, except for the temperature condition of the catalyst carrier, are obtained or not among the conditions for detecting deterioration of at least one catalytic converter, and electric power is supplied from a power source to the electric heater when the deterioration determination conditions, except the temperature condition of the catalyst carrier, are all obtained.

Whether the conditions, except the temperature condition of the catalyst carrier, are all obtained or not may be determined when the internal combustion engine is in the idling operation condition, and this idling operation condition may be limited to the idling operation condition of immediately after the start of the internal combustion engine.

The electric power may be supplied from the power source to the electric heater only when the catalyst carrier has not been activated.

When the temperature of the catalyst carrier has not reached the activation temperature, furthermore, the time for supplying the electric power to the electric heater may be controlled depending upon a temperature difference between the present temperature of the catalyst carrier and the activation temperature.

Furthermore, the detection of deterioration of the catalytic converter may be executed when the time for supplying the electric power to the electric heater has exceeded a predetermined period of time.

According to the present invention, the catalyst carrier can be reliably activated when it is attempted to determine deterioration of the catalytic converter. Therefore, deterioration of the catalytic converter can be precisely determined.

If the conditions, except the temperature condition of the catalyst carrier, are determined to be all obtained or not while the internal combustion engine is in the idling operation condition in which the exhaust gas temperature remains stable, activation of the catalyst carrier can be precisely estimated and the control operation can be further improved for determining deterioration. When the idling operation condition is limited to the idling operation condition immediately after the start of the internal combustion engine, furthermore, deterioration of the catalytic converter can be determined just after the start. This helps prevent the vehicle from being driven in a defective state in case the catalytic converter has deteriorated.

With the electric power being supplied to the electric heater from the power source when the catalyst carrier has not been activated, furthermore, electric power is supplied to the electric heater only when it is necessary and a load exerted on the power source can be decreased. Moreover, when the temperature of the catalyst carrier has not reached the activation temperature, the time for supplying the electric power to the electric heater is controlled depending upon a temperature difference between the present temperature of the catalyst carrier and the activation temperature, and the electric power is supplied efficiently and in small amounts.

When the detection of deterioration of the catalytic converter is executed after the time for supplying the electric power to the electric heater has exceeded a predetermined period of time, furthermore, deterioration can be determined after the catalyst carrier is reliably heated and is activated.

BRIEF DESCRIPTION OF THE DRAWINGS

The present invention will be more clearly understood from the description as set forth below with reference to the accompanying drawings, wherein:

FIG. 1A is a diagram illustrating the basic constitution of a device for detecting deterioration of a catalytic converter of the present invention;

FIG. 1B is a diagram illustrating the constitution of when an idling operation detecting circuit is added to the basic constitution of the device for detecting deterioration of the catalytic converter shown in FIG. 1A;

FIG. 1C is a diagram illustrating the constitution of when a completion-of-start detecting circuit is added to the constitution of the device for detecting deterioration of the catalytic converter shown in FIG. 1B;

FIG. 1D is a diagram illustrating the constitution of when a catalyst temperature detecting circuit and a catalyst activation determining circuit are added to the constitution of the device for detecting deterioration of the catalytic converter shown in FIG. 1C;

FIG. 1E is a diagram illustrating the constitution of when an activation temperature difference operation circuit and a heater power feeding time operation circuit are added to the constitution of the device for detecting deterioration of the catalytic converter shown in FIG. 1D;

FIG. 1F is a diagram illustrating the constitution of when a feeding time measuring circuit is added to the constitution of the device for detecting deterioration of the catalytic converter shown in FIG. 1E;

FIG. 5A is a flow chart illustrating a procedure for controlling the supply of electric power to the electrically heated catalyst according to a second embodiment of the present invention;

FIG. 5B is a flow chart according to a modified example of the second embodiment and illustrates only those portions different from the flow chart of FIG. 5A;

FIG. 6A is a diagram illustrating a change in the vehicle speed when a vehicle is operated according to a given operation pattern;

FIG. 6B is a diagram illustrating on-off characteristics of the heater that is turned on according to the control procedure of the second embodiment when the vehicle speed is changing as shown in FIG. 6A;

FIG. 6C is a diagram illustrating a change in the time for continuing the idling operation condition in the operation pattern of FIG. 6A;

FIG. 6D is a diagram illustrating a waveform of a deterioration detection condition hold signal output in the control procedure of the second embodiment in the operation pattern of FIG. 6A;

FIG. 6E is a diagram illustrating a change in the temperature of the catalytic converter that changes depending upon the control procedure of the second embodiment in the operation pattern of FIG. 6A;

FIG. 7 is a flow chart illustrating a procedure for controlling the supply of electric power to the electrically heated catalyst according to a third embodiment of the present invention;

FIG. 8A is a diagram illustrating a change in the vehicle speed according to another operation pattern;

FIG. 8B is a diagram illustrating a change in the temperature of the catalytic converter that changes depending upon a change in the vehicle speed of FIG. 8A, and a change in the catalyst temperature depending upon the control procedure of the third embodiment;

FIG. 8C is a diagram illustrating a state of when the FEHC is turned on at a time t12;

FIG. 8D is a diagram illustrating a state of when the FEHC is turned on at a time t17.

DESCRIPTION OF THE PREFERRED EMBODIMENTS

Figure 2:
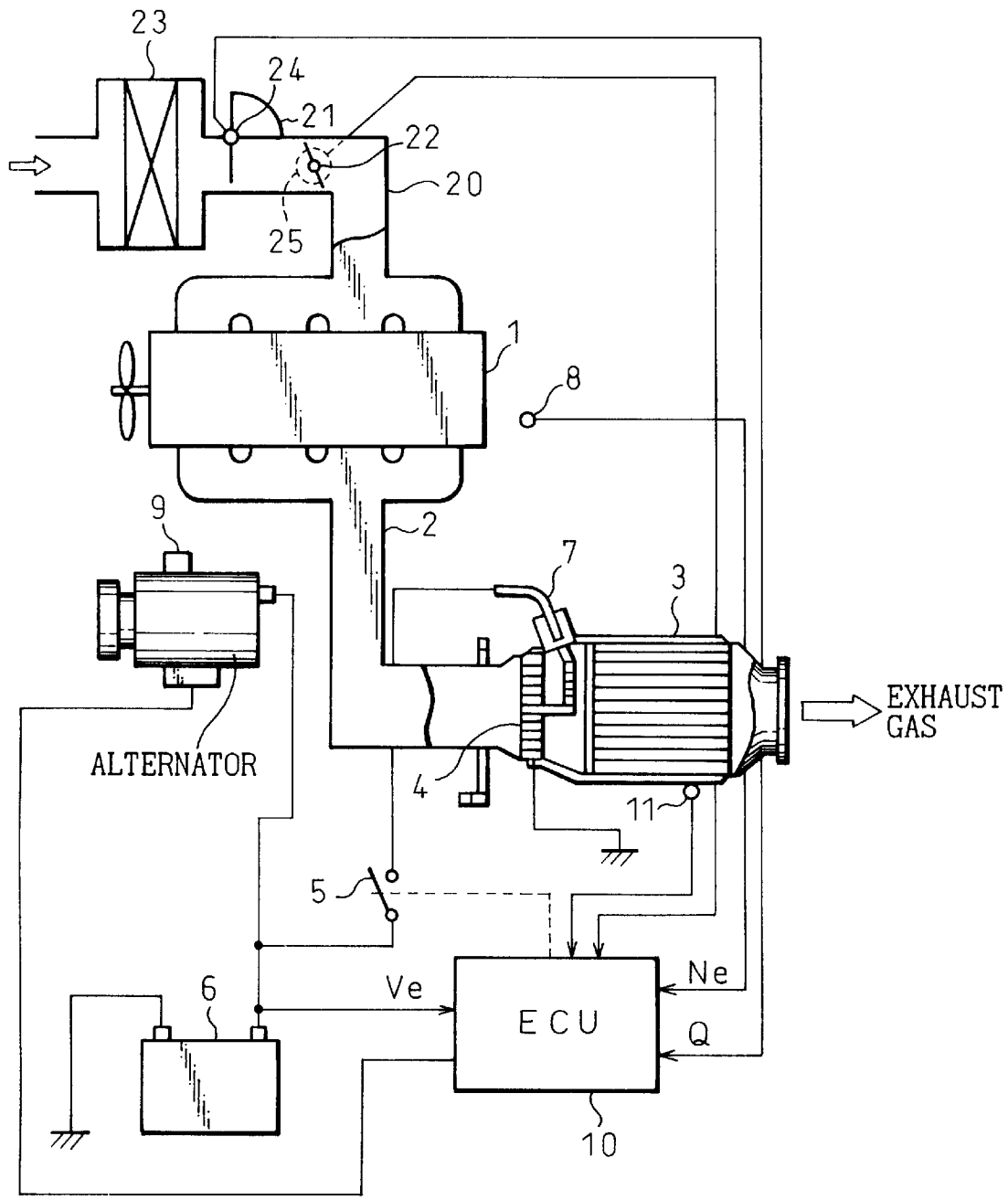
FIG. 2 is a diagram illustrating the constitution of the device for detecting deterioration of the catalytic converter of the present invention in an internal combustion engine which is equipped with an electrically heated catalyst and the catalytic converter.

Embodiments of the invention will now be described in detail with reference to the accompanying drawings.

FIG. 1A illustrates the basic constitution of a device 100 for detecting deterioration of a catalyst equipped with an electric heater according to the present invention. As shown in FIG. 1A, at least one catalytic converter 3 is provided in an exhaust gas passage 2 of an internal combustion engine 1. On the upstream side of the catalytic converter 3 are provided an electric heater 4 for forcibly heating the catalyst carrier in the catalytic converter 3, a power source 6 for supplying the electric power to the heater 4, and a switch 5 for controlling the supply of electric power to the heater 4 from the power source 6. The device 100 for detecting deterioration of the catalyst comprises a catalyst deterioration detecting circuit 30 for detecting deterioration of the catalytic converter 3, a circuit 101A for detecting catalyst deterioration determination conditions, and a heater current control circuit 101B. The circuit 101A for detecting catalyst deterioration determination conditions determines whether the conditions, except the catalyst carrier temperature condition, are all obtained or not among the conditions for detecting deterioration of at least one catalytic converter 3. When the deterioration determination conditions, except the catalyst carrier temperature condition, are all obtained, the heater current control circuit 101B turns the switch 5 on so that the electric power is supplied to the electric heater 4 from the power source 6.

Accordingly, the electric power is supplied to the electric heater 4 when the catalytic converter 3 is checked for its deterioration by the catalyst deterioration detecting circuit 30. Therefore, the catalyst carrier 3 is reliably activated, and deterioration of the catalyst is precisely determined.

In this basic constitution, the electric heater 4 is provided on the upstream side of the catalytic converter 3. The electric heater 4, however, may be an electrically heated catalyst containing an electric heater therein.

FIG. 1B illustrates the constitution of an idling operation condition detecting circuit 102 for detecting the idling operation condition of the internal combustion engine added to the basic constitution of the device 100 for detecting deterioration of the catalyst shown in FIG. 1A. With the idling operation condition detecting circuit 102 added to the device 100 for detecting deterioration of the catalyst, the circuit 101A for detecting catalyst deterioration determination conditions determines whether the conditions, except the catalyst carrier temperature condition, are all obtained or not under the idling operation condition of the internal combustion engine 1. Even in this constitution, the electrically heated catalyst may be used as the electric heater 4.

In the device 100 for detecting deterioration of the catalyst constituted as shown in FIG. 1B, therefore, whether the conditions, except the temperature condition of catalyst carrier 3, are all obtained or not are determined while the internal combustion engine is in the idling operation condition in which the exhaust gas temperature remains stable. Accordingly, activation of the catalyst can be precisely estimated, and the control operation is further improved for determining deterioration.

FIG. 1C illustrates the constitution of a completion-of-start detecting circuit 103 for detecting the completion of start of the internal combustion engine 1 added to the constitution of the device 100 for detecting deterioration of the catalyst shown in FIG. 1B. With the completion-of-start detecting circuit 103 being added to the device 100 for detecting deterioration of the catalyst, the circuit 101A for detecting catalyst deterioration determination conditions determines whether the conditions, except the temperature condition of the catalyst carrier 3, are all obtained or not under the idling operation condition immediately after the start of the internal combustion engine 1. Even in this constitution, the electrically heated catalyst may be used as the electric heater 4.

In the device 100 for detecting deterioration of catalyst constituted as shown in FIG. 1C, therefore, the idling operation condition is limited to the idling operation condition of just after the start of the internal combustion engine 1 and, hence, deterioration of the catalyst is determined immediately after the start of the engine. Therefore, the device 100 for detecting deterioration of the catalyst constituted as shown in FIG. 1C makes it possible to prevent the vehicle from being driven in a state where the catalyst carrier 3 has been deteriorated.

FIG. 1D illustrates the constitution of when a catalyst temperature detecting circuit 104A for detecting the temperature of the catalyst 3 and a catalyst activation determining circuit 104B for determining whether the temperature of the catalyst carrier 3 has reached the activation temperature or not, are added to the constitution of the device 100 for detecting deterioration of the catalyst shown in FIG. 1C. With the catalyst temperature detecting circuit 104A and the catalyst activation determining circuit 104B being added to the device 100 for detecting deterioration of the catalyst, the heater current control circuit 101B turns the switch 5 on to supply the electric power to the electric heater 4 only when the catalyst carrier 3 has not been activated. Even in this constitution, the electrically heated catalyst can be used as the electric heater 4.

Accordingly, the electric power is supplied to the electric heater 4 only when the catalyst carrier 3 has not been activated; i.e., the electric power is supplied to the electric heater 4 only when it is needed, and load exerted on the power source 6 can be decreased.

FIG. 1E is a diagram illustrating the constitution of when an activation temperature difference operation circuit 105A and a heater power feeding time operation circuit 105B are added to the constitution of the device 100 for detecting deterioration of the catalyst shown in FIG. 1D. When the temperature of the catalyst carrier 3 has not reached the activation temperature, the activation temperature difference operation circuit 105A calculates a difference between the present temperature of the catalyst carrier 3 and the activation temperature. Depending upon the calculated temperature difference, furthermore, the activation temperature difference operation circuit 105A counts the time for feeding the electric power to the electric heater 4. With the activation temperature difference operation circuit 105A and the heater power feeding time operation circuit 105B being added to the device 100 for detecting deterioration of the catalyst, the heater current control circuit 101B turns the switch 5 on for only a period of time counted by the heater power feeding time operation circuit 105B to supply the electric power to the electric heater 4. Even in this constitution, the electrically heated catalyst can be used as an electric heater 4.

When the temperature of the catalyst carrier 3 has not reached the activation temperature, therefore, the time for feeding the electric power to the electric heater 4 may be controlled depending upon a difference between the present temperature of the catalyst carrier 3 and the activation temperature. Accordingly, the electric power is efficiently supplied without waste.

FIG. 1F is a diagram illustrating the constitution of when a power feeding time measuring circuit 106 is added to the constitution of the device 100 for detecting deterioration of the catalyst shown in FIG. 1E in order to measure a time from when the supply of electric power is started by the heater power control circuit 101B. With the power feeding time measuring circuit 106 being added to the device 100 for detecting deterioration of the catalyst, the catalyst deterioration detecting circuit 30 executes the operation for detecting deterioration of the catalyst carrier 3 when the time for supplying the electric power to the electric heater 4 has exceeded a predetermined period of time. Even in this constitution, the electrically heated catalyst can be used as the electric heater 4.

The power feeding time measuring circuit 106 shown in FIG. 1F can be added to any constitution of the device 100 for detecting deterioration of the catalyst shown in FIGS. 1A to 1D as indicated by a broken line. With the power feeding time measuring circuit 106 being added to any device 100 for detecting deterioration of the catalyst shown in FIGS. 1A to 1D, the catalyst deterioration detecting circuit 30 executes the operation for detecting deterioration of the catalyst carrier 3 when the time for supplying the electric power to the electric heater 4 has exceeded a predetermined period of time.

The device 100 for detecting deterioration of the catalyst to which the power feeding time measuring circuit 106 is added, executes the operation for detecting deterioration of the catalyst carrier 3 when the time for feeding the electric power to the electric heater 4 has exceeded a predetermined period of time. Therefore, the operation for determining deterioration is executed after the catalyst carrier 3 is reliably warmed up and is activated. Accordingly, deterioration of the catalyst carrier 3 can be detected more reliably.

FIG. 2 is a diagram illustrating the whole constitution of the device for detecting deterioration of the catalytic converter of the present invention provided for the internal combustion engine mounting the catalytic converter 3 which uses an electrically heated catalyst 4 as the electric heater 4.

In FIG. 2, an intake air passage 20 of the internal combustion engine 1 is provided with an air cleaner 23. On the downstream side thereof are further provided an air flow meter 21 and a throttle valve 22. The air flow meter 21 is provided with an air flow sensor 24 for detecting the amount of the intake air. A value Q representing the amount of the intake air detected by the air flow sensor 24 is sent as a load quantity to an ECU (engine control unit) 10.

The throttle valve 22 is provided with an idling detecting switch 25 for detecting the idling condition of the internal combustion engine 1, and the output of the idling detecting switch 25 is sent to the ECU 10.

The exhaust gas passage 2 of the internal combustion engine 1 is provided with an ordinary catalytic converter 3. On the upstream side of the catalytic converter 3 is provided an electrically heated catalyst 4. The electrically heated catalyst 4 carries a three-way catalyst and contains an electric heater. Reference numeral 7 denotes an electrode of the electric heater in the electrically heated catalyst 4. The catalytic converter 3 may be provided with a catalyst temperature sensor 11 for detecting the temperature of the catalyst. The output of the catalyst temperature sensor 11 is input to the ECU 10.

On the output side of the internal combustion engine 1 is provided a revolution number sensor 8 for detecting the number of revolutions of the internal combustion engine 1. Near the internal combustion engine 1 is provided a generator (alternator) 9 which is driven by the internal combustion engine 1 and generates electricity. A battery (power source) 6 mounted on the vehicle is electrically charged with the electric power generated by the alternator 9. The alternator 9 incorporates a circuit for controlling the amount of electricity generated.

In this embodiment, the output terminal of the battery 6 is input to the ECU 10 and is further input to the electrode 7 of the electrically heated catalyst 4 through a relay 5 which is an opening/closing switch. The relay 5 is actuated by a control signal from the ECU 10. When the relay 5 is turned on, the electric power is supplied from the battery 6 to the electrically heated catalyst 5 which is then heated.

The operation of the thus constituted device for detecting deterioration of the catalytic converter will now be described with reference to a flow chart. The electrically heated catalyst 4 will hereinafter be expressed as EHC 4.

Figure 3:
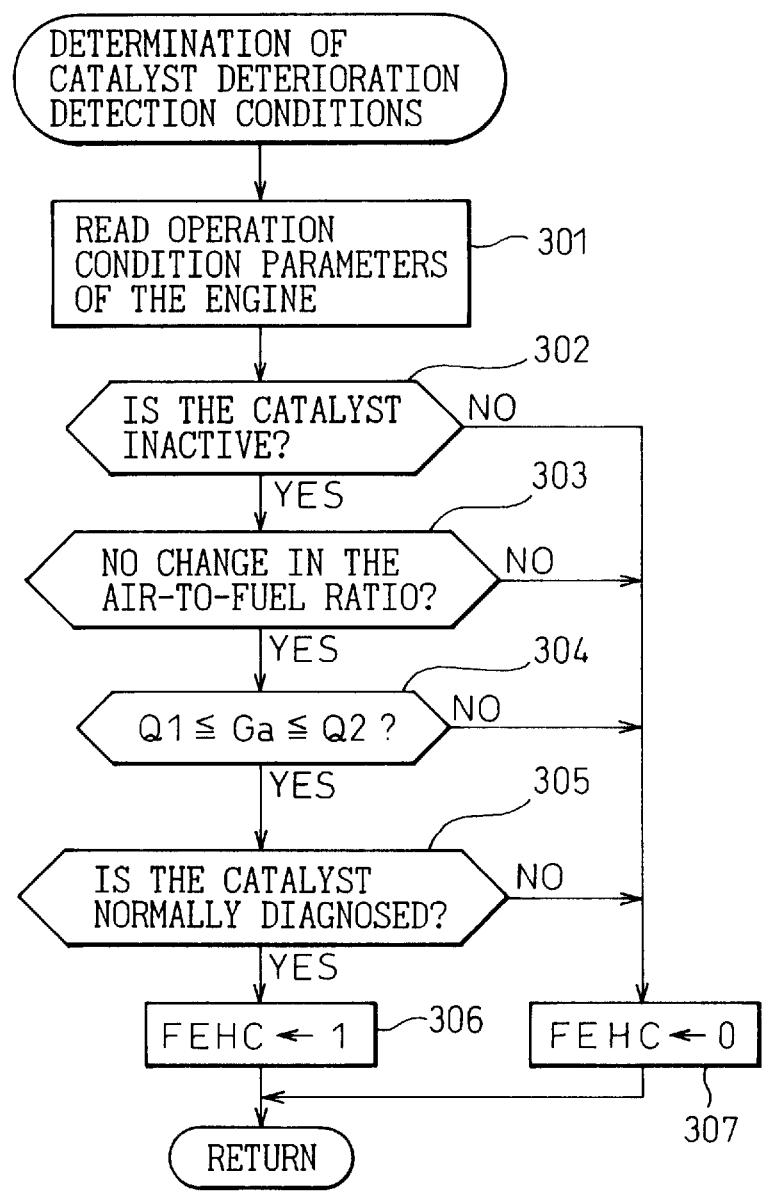
FIG. 3 is a flow chart illustrating a procedure for determining the catalyst deterioration detection conditions according to the present invention.

FIG. 3 is a flow chart illustrating a procedure for determining deterioration detection conditions of the catalytic converter 3 according to the present invention. The flow chart is executed every after a predetermined period of time.

At a step 301, first, operation condition parameters of the internal combustion engine 1 are read, e.g., amount Q of the intake air, on-off state of the idling detecting switch, number Ne of revolutions of the engine, terminal voltage Ve of the battery 6, etc. are read. At a next step 302, it is determined whether the catalytic converter 3 is inactive or not. The inactive state of the catalytic converter 3 can be determined by detecting the temperature of the catalytic converter 3 using the catalyst temperature sensor 11 or by detecting the integral amount of the intake air from the start. When it is determined at the step 302 that the catalytic converter 3 is inactive, the routine proceeds to a step 303 where it is determined whether there is a change in the air-to-fuel ratio of the engine.

The above-mentioned step 302 may be omitted. The step 302 is introduced in order to control the supply of electric power to the EHC 4 while the catalytic converter 3 is inactive. In other words, the step 302 is introduced so that unnecessary current will not flow into the EHC 4.

When there is no change in the air-to-fuel ratio at the step 303, the routine proceeds to a step 304 where it is determined whether the amount Ga of the intake air per a unit number of revolutions of the engine lies within a predetermined range (Q1≦Ga≦Q2). When Q1≦Ga≦Q2 holds, the routine proceeds to a step 305 where it is determined whether the diagnosis for detecting any broken heater wire of EHC 4 is normal or not. When the diagnosis is normal, the routine proceeds to a step 306 where a flag FEHC is set to 1 to indicate that the deterioration detection conditions of the catalytic converter 3 can be determined by supplying the electric power to the heater of the EHC 4. The routine then ends.

In addition to determining the above-mentioned deterioration detection conditions of the catalytic converter 3, it is also possible to determine whether the terminal voltage Ve of the battery 6 that supplies electric power to the heater of the EHC 4 lies between a minimum permissible voltage V2 and a maximum permissible voltage V1, thereby to determine if the electric power can be supplied to the heater of the EHC 4. According to this determination method, the electric power is not supplied to the heater of the EHC 4 when the battery voltage is lower than a predetermined value since the electric power is not stably supplied to the EHC 4. When the battery voltage is higher than the predetermined value, on the other hand, the catalyst is protected by decreasing the electric load that is produced when a high voltage is applied. The electric power is supplied to the heater of the EHC 4 only when the terminal voltage Ve of the battery 6 lies between the minimum permissible voltage V2 and the maximum permissible voltage V1.

The routine proceeds to a step 307 when the catalytic converter 3 has been activated already at the step 302, when the air-to-fuel ratio is changing at the step 303, when it is determined that Ga<Q1 or Ga>Q2 at the step 304 and when the diagnosis is abnormal at the step 305. At the step 307, the flag FEHC for supplying the electric power to the heater of the EHC 4 is set to 0 to end the routine.

Figure 4:
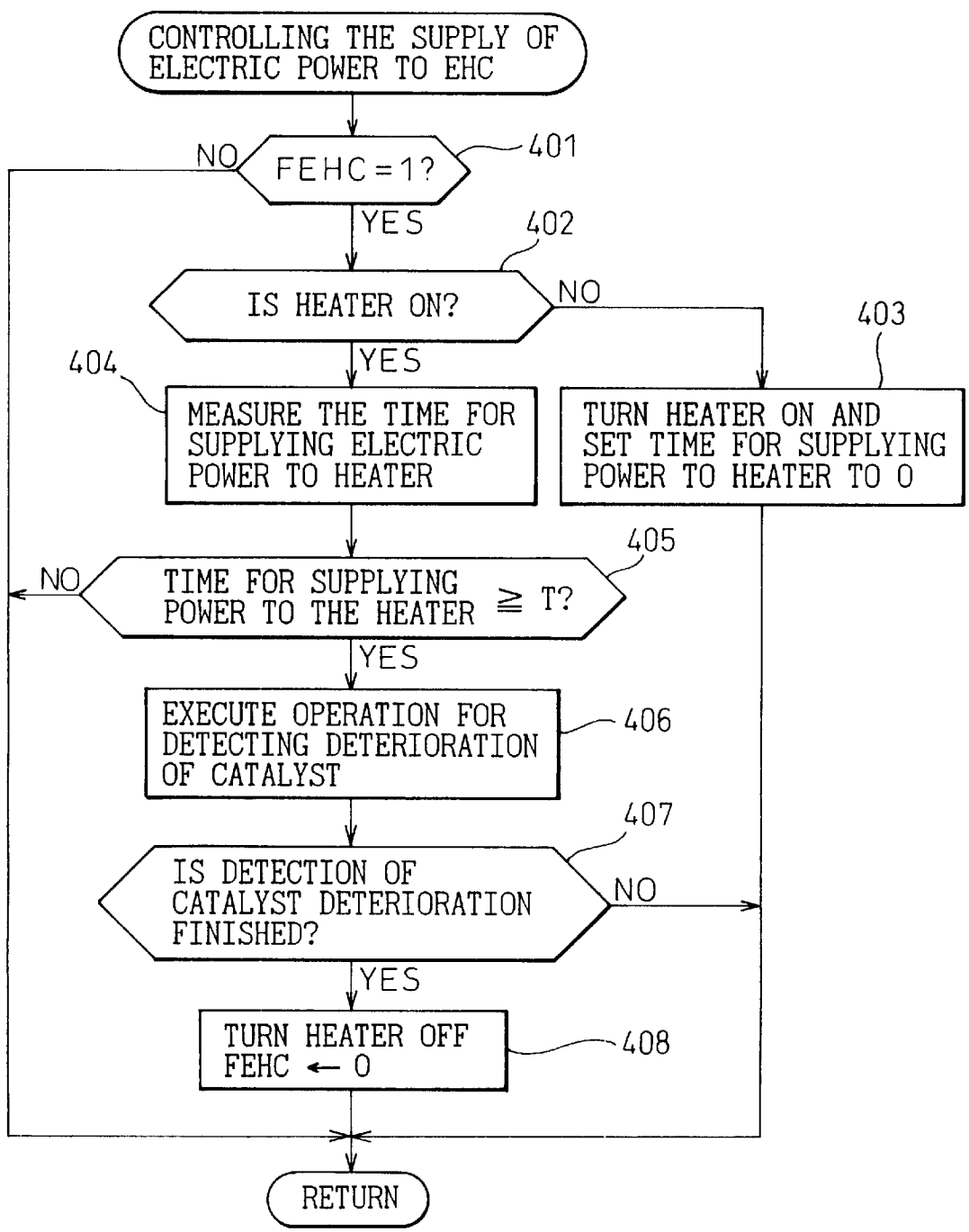
FIG. 4 is a flow chart illustrating a procedure for controlling the supply of electric power to the electrically heated catalyst according to a first embodiment of the present invention.

FIG. 4 is a flow chart illustrating a procedure for controlling the supply of electric power to the EHC 4 according to a first embodiment of the present invention.

At a step 401, it is determined whether the flag FEHC for supplying the electric power to the heater of the EHC 4 is 1 or not. When FEHC=0, the routine ends. When FEHC=1, the program proceeds to a step 402 where it is determined whether the heater of the EHC 4 is now being supplied with electric power (hereinafter referred to as on) or not. When the heater of the EHC 4 is not on, the routine proceeds to a step 403 where the heater of the EHC 4 is turned on and the time for supplying the electric power to the heater of the EHC 4 is cleared to end the routine.

When the heater of the EHC 4 is turned on, the routine proceeds to a step 404 since the heater of the EHC 4 has been turned on when the routine has proceeded to the step 402 next. At the step 404, the time for supplying the electric power to the heater of the EHC 4 is measured. At a next step 405, it is determined whether the time for supplying the electric power to the EHC 4 has exceeded a predetermined period of time T. When the time for supplying the electric power to the heater has not reached the predetermined period of time T, the routine ends. When the time for supplying the electric power has reached the predetermined period of time T, the routine proceeds to a step 406. The predetermined period of time T is the one in which the catalytic converter 3 is sufficiently warmed up after starting the supply of electric power to the heater of the EHC 4.

At a step 406, the operation is executed for detecting deterioration of the catalytic converter 3. Deterioration of the catalytic converter 3 is detected by a catalyst deterioration detector device that is not shown. The catalyst deterioration detector device detects the degree of deterioration of the catalytic converter 3 by the deterioration detection method based upon a ratio of loci or by the deterioration detection method based upon a ratio of periods. The method of detecting deterioration of the catalyst has heretofore been known and is not described.

At the step 406, furthermore, a catalyst deterioration detection condition hold signal is generated indicating that the deterioration detection conditions of the catalytic converter 3 are all held. The catalyst deterioration detection condition hold signal is input to the catalyst deterioration detector device that is not shown. Upon receiving the catalyst deterioration detection condition hold signal, the catalyst deterioration detector device detects the degree of deterioration of the catalytic converter 3 based upon the above-mentioned method.

At a step 407, it is determined whether the detection of catalyst deterioration is finished or not. When it is determined that the detection of catalyst deterioration has not finished, the electric power is continuously supplied to the heater of the EHC 4. When the detection of deterioration has been finished, the electric power is no longer supplied (hereinafter referred to as off) to the heater of the EHC 4 at a step 408, and the flag FECH is cleared to end the routine.

In the first embodiment as described above, when the conditions, except the catalyst temperature condition, are all obtained among the deterioration detection conditions of the catalytic converter 3 according to the procedure shown in FIG. 3, the electric power is supplied to the heater of the EHC 4 according to the procedure shown in FIG. 4 to expand the range of deterioration detection conditions of the catalytic converter 3. As a result, the catalyst carrier can be reliably activated when deterioration of the catalyst is to be determined. Namely, deterioration of the catalyst is precisely determined.

The constitution of the device for detecting deterioration of the catalytic converter of the first embodiment corresponds to the constitution of when the power feeding time measuring circuit 106 of FIG. 1F is added to the constitution of the device for detecting deterioration of the catalytic converter of FIG. 1A.

FIG. 5A is a flow chart illustrating a procedure of controlling the supply of current to the EHC 4 according to a second embodiment of the present invention. In the second embodiment, the supply of electric power to the heater of the EHC 4 of the first embodiment is permitted only in the idling operation condition of the engine. Therefore, the same step numbers are attached to the same steps as those of the control procedure of the first embodiment described with reference to FIG. 4, and their description is not repeated. The second embodiment corresponds to controlling the supply of electric power to the EHC 4 in the device for detecting deterioration of the catalytic converter shown in FIG. 1B.

At a step 501, it is determined whether the flag FEHC for feeding the electric power to the heater of the EHC 4 is 1 or not. When FEHC=1, the routine proceeds to a step 502 where it is determined whether the engine is decelerating or not. The engine is determined to be decelerating when the fully closed state of the throttle valve 22 is detected by the idling detecting switch 25 provided for the throttle valve 22 of the engine and when the number Ne of revolutions of the engine is changing in the negative direction or when the speed of the vehicle is decreasing. When the deceleration condition of the engine is detected as described above, the routine proceeds from the step 502 to a step 503.

At a step 503, it is determined whether the vehicle speed is smaller than a predetermined speed V or not. When the vehicle speed is high, the exhaust gas temperature is high and the catalytic converter 3 has, in many cases, been warmed up. In this case, therefore, the electric power is not supplied to the heater of the EHC 4. When the vehicle speed<predetermined speed V, the routine proceeds to a step 504 where it is determined whether the heater of the EHC 4 is now on or not. When the heater of the EHC 4 is not on, the routine proceeds to a step 505 where the heater of the EHC 4 is turned on and the time for continuing the idling operation is cleared to end the routine.

When the heater of the EHC 4 is turned on as described above, the heater of the EHC 4 will have been turned on when the routine has proceeded to the step 504 next time in the same conditions. Therefore, the routine proceeds to a step 506 where it is determined whether the engine is in the idling condition or not. The engine is determined to be in the idling condition when the fully closed state of the throttle valve 22 is detected by the idling detecting switch 25 provided for the throttle valve 22. When the engine is in the idling condition, the routine proceeds to a step 507, where the time in which the idling operation is continuing is measured.

At a next step 508, it is determined whether the time for continuing the idling operation has exceeded a predetermined period of time AT or not. When the time for continuing the idling operation is shorter than the predetermined period of time AT, the routine ends. When the time for continuing the idling operation has reached the predetermined period of time AT, deterioration of the catalytic converter 3 is detected in compliance with the same procedure of the step 406 and subsequent steps described in the first embodiment. When the detection of deterioration of the catalyst is finished, the heater of the EHC 4 is turned off and the flag FEHC is cleared to end the routine.

The routine ends when it is determined at the step 501 that FEHC=0, when it is determined at the step 502 that the engine is not decelerating, when it is determined at the step 503 that vehicle speed>predetermined speed V, when it is determined at the step 506 that the engine is not in the idling condition, and when it is determined at the step 508 that the time for continuing the idling operation is shorter than the predetermined period of time AT.

In the control procedure of FIG. 5A, the deterioration detection conditions of the catalyst are determined in the idling state where the vehicle speed is low after the engine has decelerated. As shown in FIG. 5B, however, it is also allowable to introduce a step 502' in place of the steps 502 and 503, in order to determine the deterioration detection conditions of the catalyst in the idling state immediately after the starting of the engine. This modified embodiment corresponds to controlling the supply of electric power to the EHC 4 in the device for detecting deterioration of the catalytic converter shown in FIG. 1C.

FIGS. 6A to 6E are time charts concretely illustrating the control operation of the second embodiment of when the vehicle is decelerated to decrease its speed and the idling condition is assumed.

FIG. 6A shows the vehicle speed of when the vehicle is decelerated at a time t1 and is placed in the idling operation condition after a time t3. When the vehicle speed reaches the predetermined speed V at a time t2 and then becomes lower than the predetermined speed V as shown in FIG. 6B, the heater of the EHC 4 is turned on as explained with reference to the step 503 of FIG. 5A. As shown in FIG. 6C, then, as the vehicle is placed in the idling operation condition after the time t3, the idling time is counted.

Referring to FIG. 6E, the catalyst temperature drops after the time t1 of start of deceleration. The catalyst temperature, however, rises again when the electric power is fed to the heater of the EHC 4 at the time t2. The catalyst temperature rises as the electric power is fed to the heater and reaches a nearly constant temperature after a predetermined period of time has passed. At a time t4 when the catalyst temperature becomes nearly constant, the time of the idling operation condition reaches the predetermined period of time AT as shown in FIG. 6C. As shown in FIG. 6D, therefore, a deterioration detection condition hold signal (deterioration detection OK signal in the drawing) is generated. According to the second embodiment as described above, the deterioration detection condition for the catalytic converter 3 can be held by supplying an electric power to the EHC 4 even in a state where the deterioration detection condition for the catalytic converter 3 does not usually hold.

According to the second embodiment as described above, whether the deterioration detection conditions for the catalytic converter 3 hold or not in the first embodiment is determined only during the idling operation condition of the engine in compliance with the procedure shown in FIG. 5A or 5B. The exhaust gas temperature remains stable in the idling operation condition and, hence, activation of the catalyst can be precisely estimated making it possible to further improve the control operation for determining deterioration.

FIG. 7 is a flow chart illustrating a procedure for controlling the supply of electric power to the EHC 4 according to a third embodiment of the present invention. According to the third embodiment, the electric power is supplied to the heater of the EHC 4 depending upon the temperature of the catalytic converter 3. In the control procedure of the third embodiment, the same step numbers are attached to the same steps as those of the control procedure of the above-mentioned embodiment, and their description is not repeated. The third embodiment corresponds to controlling the supply of electric power to the EHC 4 in the device for detecting deterioration of the catalytic converter shown in FIG. 1D.

At a step 701, it is determined whether the flag FEHC for supplying the electric power to the heater of the EHC 4 is 1 or not. When FEHC=1, the routine proceeds to a step 702 where the catalyst temperature is detected or is estimated. The catalyst temperature is detected by the catalyst temperature sensor 11 provided for the catalytic converter 3. When the catalytic converter 3 is not provided with the catalyst temperature sensor 11, the temperature of the catalytic converter 3 is found by estimation.

The temperature of the catalytic converter 3 can be estimated by utilizing such parameters as the amount Ga of the intake air, exhaust gas temperature found based on the number Ne of revolutions of the engine and the engine load, amount of heat radiated by the catalytic converter 3, air-to-fuel ratio, vehicle speed, degree of cooling the catalytic converter 3 due to the air flow at the atmospheric temperature, etc.

As the catalyst temperature of the catalytic converter 3 is detected as described above, it is determined at a step 703 whether the catalyst temperature is lower than a desired catalyst temperature (desired value) by more than a predetermined temperature K (°C.) or not. When the catalyst temperature<[desired value−k], the routine proceeds to a step 704 where the heater of the EHC 4 is turned on, and the routine proceeds to a step 707. When the catalyst temperature≧[desired value−k], on the other hand, the routine proceeds to a step 705 where it is determined whether the catalyst temperature is higher than the desired catalyst temperature (desired value) by more than the predetermined temperature K° C. or not. When [desired value−K]≦catalyst temperature<[desired value+K], the routine proceeds to a step 707. When catalyst temperature≧[desired value+K], the heater of the EHC 4 is turned off at a step 706, and the routine proceeds to the step 707.

At the step 707, it is determined whether the temperature of the catalytic converter 3 has entered into a range of T1≦catalyst temperature≦T2 which is a permissible temperature range for determining deterioration of the catalyst. The routine proceeds to a step 406 only when the catalyst temperature has entered into the range T1≦catalyst temperature≦T2, whereby deterioration of the catalytic converter 3 is detected in compliance with the same procedure as the step 406 and subsequent steps described in the first embodiment. When the detection of deterioration of the catalyst is finished, the heater of the EHC 4 is turned off, and the flag FEHC is cleared to end the routine.

The routine ends when it is determined at the step 701 that FEHC=0 and it is determined at the step 707 that catalyst temperature<T1 or catalyst temperature>T2.

FIGS. 8A to 8D are time charts concretely illustrating the control operation according to a third embodiment of when the vehicle is accelerated to assume a high-speed steady operation and is then decelerated to assume an intermediate-speed steady operation, and is further decelerated to run at low speeds, and finally assumes the idling condition.

FIG. 8A illustrates the vehicle speeds of when the vehicle is accelerated at a time t10 to assume a high-speed steady operation at a time t11, decelerated at a time t13 to assume an intermediate-speed steady operation at a time t14, and is further decelerated at a time t18 to run at low speeds, and assumes the idling condition at a time t20. In these operation conditions, it is now presumed that the temperature of the catalytic converter 3 varies as shown in FIG. 8B.

It is now presumed that other deterioration determination conditions of the catalyst are all obtained, and FEHC=1 is obtained at a time t12 as shown in FIG. 8C. In this case, as described with reference to the step 703 of FIG. 7, the heater of the EHC 4 is turned on when the catalyst temperature becomes lower than [desired value−K] at a moment t15. As a result, the temperature of the catalytic converter 3 increases as indicated by a broken line and reaches a predetermined temperature and remains stable.

When other deterioration determination conditions of the catalyst are all obtained and FEHC=1 is obtained at a time t17 as shown in FIG. 8D, the catalyst temperature at this time becomes lower than the desired value−K. Accordingly, the heater of the EHC 4 is readily turned on. As a result, the temperature of the catalytic converter 3 rises as indicated by a dot-dash chain line, reaches the predetermined temperature and remains stable.

According to the third embodiment as described above, the deterioration detection conditions for the catalytic converter 3 are obtained by supplying an electric power to the EHC 4 even when the deterioration detection conditions for the catalytic converter 3 cannot be usually obtained.

According to the third embodiment as described above, the electric power is supplied to the heater of the EHC 4 in compliance with the procedure shown in FIG. 7 only when the catalyst temperature is deviated, by a predetermined temperature range, from a desired temperature at which deterioration of the catalyst can be detected. As a result, the electric power is supplied to the electric heater only when necessary, and the load exerted on the power source can be decreased.

Figure 9:
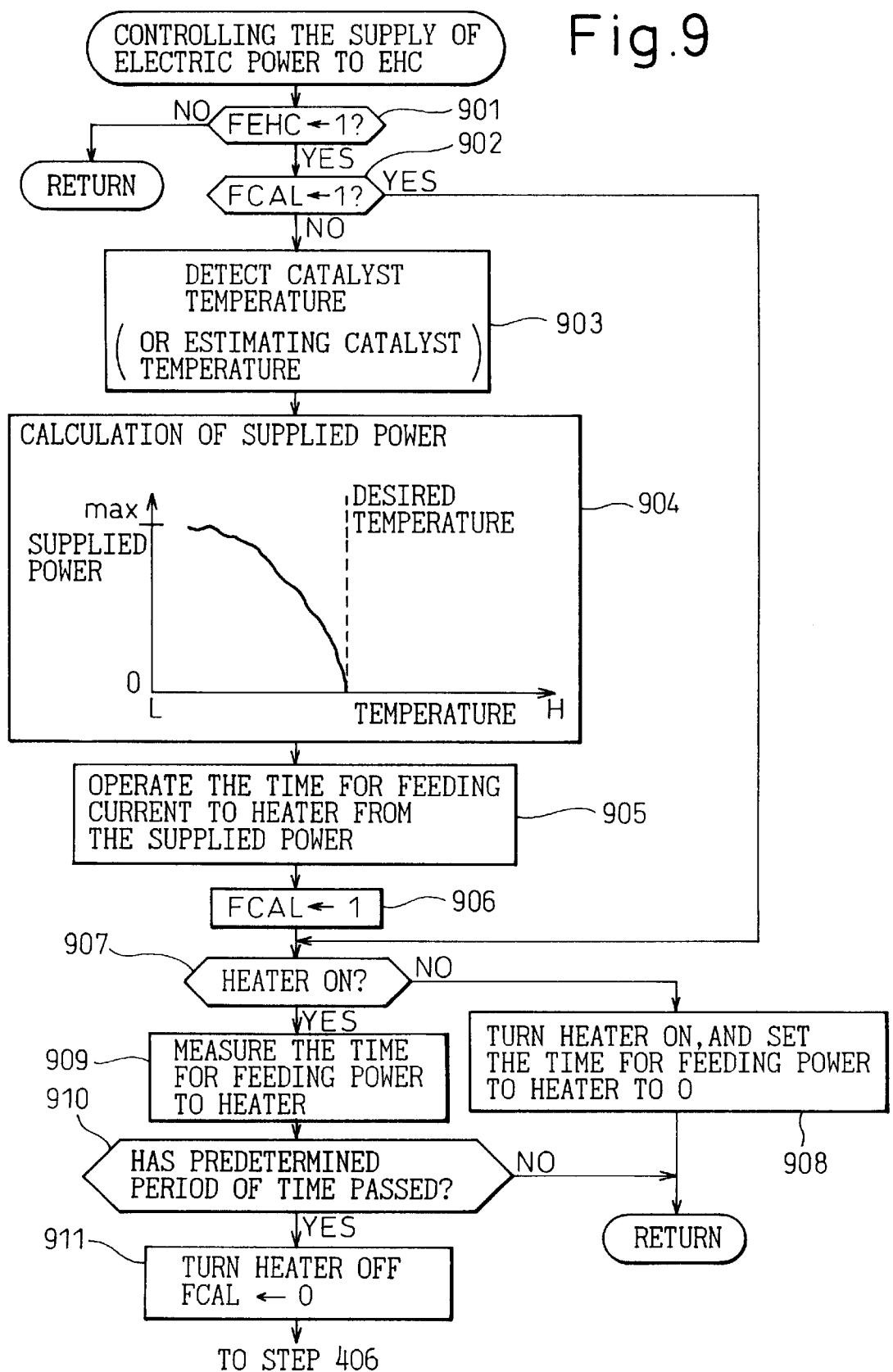
FIG. 9 is a flow chart illustrating a procedure for controlling the supply of electric power to the electrically heated catalyst according to a fourth embodiment of the present invention.

FIG. 9 is a flow chart illustrating a procedure for controlling the supply of electric power to the EHC 4 according to a fourth embodiment of the present invention. In the fourth embodiment, the electric power is supplied to the heater of the EHC 4 depending upon the temperature of the catalytic converter 3. In the control procedure of the fourth embodiment, the same control portions as those of the steps in the control procedure of the above-mentioned embodiment are not diagramed. The fourth embodiment corresponds to controlling the electric power to the EHC 4 in the device for detecting deterioration of the catalytic converter shown in FIG. 1E.

At a step 901, it is determined whether a flag FEHC for supplying the electric power to the heater of the EHC 4 is 1 or not. When FEHC=0, the routine ends. When FEHC=1, the routine proceeds to a step 902 where it is determined whether the flag FCAL which indicates that the calculation for supplying electric power to the catalytic converter 3 has executed is 1 or not. When FCAL=0, the calculation for supplying electric power to the catalytic converter 3 has not been executed and the routine proceeds to a step 903 where the catalyst temperature is detected or is estimated. The catalyst temperature is detected or is estimated as described earlier.

When the temperature of the catalytic converter 3 is detected as described above, the routine proceeds to step 904 where the required amount of supplying the electric power to the catalytic converter 3 is calculated depending upon a difference between the present temperature of the catalyst and the desired value by using an electric power supply map previously made depending upon a difference from the desired temperature (desired value) of the catalyst that has been calculated in advance. The time for supplying the electric power to the heater of the EHC 4 is calculated from the calculated amount of electric power for supply at a next step 905. At a step 906, the flag FCAL that indicates the operation for supplying the electric power to the catalytic converter 3 has executed is set to 1.

At a next step 907, it is determined whether the heater of the EHC 4 is on or not. When the heater of the EHC 4 is not on, the routine proceeds to a step 908 where the heater of the EHC 4 is turned on and the time for supplying the electric power to the heater of the EHC 4 is cleared to end the routine.

Thus, when the value of FCAL is set to 1 and the heater of the EHC 4 is turned on, then, FCAL is 1 when the routine has proceeded to step 902 the next time. Therefore, the routine proceeds to the step 907 jumping over the steps 903 to 906. At the step 907, the heater of the EHC 4 has been already turned on and, hence, the routine proceeds to a step 909 where the time for supplying the electric power to the heater of the EHC 4 is measured. At a next step 910, it is determined whether the time for feeding a current to the heater of the EHC 4 has exceeded a predetermined period of time operated at the step 905 or not. When the time for feeding the current to the heater is shorter than the predetermined period of time, the routine ends. When the time for feeding the current to the heater has reached the predetermined period of time, the routine proceeds to a step 911.

At the step 911, the heater is turned off, the value FCAL is cleared and the routine proceeds to the step 406 where deterioration of the catalytic converter 3 is detected in compliance with the same procedure as the step 406 and the subsequent steps described in the first embodiment. When the detection of deterioration of the catalyst is finished, the heater of the EHC 4 is turned off and the flag FEHC is cleared to end the routine.

According to the fourth embodiment as described above, the deterioration detection conditions of the catalytic converter 3 can be obtained even in a state where the deterioration detection conditions of the catalytic converter 3 cannot usually be obtained.

According to the fourth embodiment as described above, the electric power is supplied to the heater of the EHC 4 according to the procedure shown in FIG. 9, so that the electric power is supplied in an amount depending upon a difference between the catalyst temperature and the desired temperature at which deterioration of the catalyst can be detected. As a result, electric power is supplied to the electric heater only when necessary, and the load exerted on the power source can be decreased.

As described above, the present invention provides a device for detecting deterioration of a catalytic converter in an internal combustion engine equipped with an electric heater on the upstream side of the catalytic converter attached to an exhaust gas passage, wherein, in determining the deterioration of the catalyst, electric power is supplied to the electric heater in order to reliably activate the catalyst, so that deterioration of the catalytic converter is precisely determined without being hindered by the temperature conditions. Accordingly, deterioration of the catalytic converter is precisely determined.

What is claimed is:

1. A device for detecting deterioration of a catalytic converter in an internal combustion engine 1 having at least one catalytic converter provided in an exhaust gas passage and an electric heater provided on the upstream side of said catalytic converter to forcibly heat a catalyst carrier in said catalytic converter, said device for detecting deterioration of the catalytic converter comprises:

means for detecting the operation condition parameters of said internal combustion engine;

means for detecting the catalyst deterioration determination conditions, except the catalyst carrier temperature condition, among the conditions for detecting deterioration of the catalytic converter out of said operation condition parameters;

means for outputting a deterioration detection determination enable signal which indicates that deterioration of said catalytic converter can be detected by supplying an electric power to said electric heater when the catalyst deterioration determination conditions, except the catalyst carrier temperature condition, are obtained; and power feed control means for supplying the electric power to said electric heater in the presence of said deterioration detection determination enable signal.

2. A device for detecting deterioration of a catalytic converter according to claim 1, further comprising means for detecting the idling operation condition of the internal combustion engine, wherein said means for detecting the catalyst deterioration determination conditions determines whether the conditions, except the catalyst carrier temperature condition, are all obtained or not when the internal combustion engine is in an idling operation condition.

3. A device for detecting deterioration of a catalytic converter according to claim 2, further comprising completion-of-start detecting means for detecting the completion of start of the internal combustion engine, wherein said means for detecting the catalyst deterioration determination conditions determines whether the conditions, except the catalyst carrier temperature condition, are all obtained or not in the idling operation condition immediately after the starting of the internal combustion engine.

4. A device for detecting deterioration of a catalytic converter according to claim 1 further comprising means for detecting the temperature of said catalyst carrier, and means for determining whether the temperature of said catalyst carrier has reached the activation temperature or not, wherein said power feed control means feeds an electric power to said electric heater only when said catalyst carrier has not been activated.

5. A device for detecting deterioration of a catalytic converter according to claim 4, further comprising means for calculating a difference between the present temperature of the catalyst carrier and the activation temperature when the temperature of said catalyst carrier has not reached the activation temperature, and means for calculating the time for feeding the electric power to said electric heater depending upon said temperature difference that is calculated, wherein said power feed control means feeds an electric power to said electric heater only during a calculated time for feeding the electric power.

6. A device for detecting deterioration of a catalytic converter according to claim 1, further comprising means for measuring the time from when the feeding of the electric power is started by said power feed control means, and means for determining whether the time for feeding the electric power to said electric heater has exceeded a predetermined period of time or not, wherein said catalyst deterioration detecting means determines the deterioration of said catalyst carrier when the time for feeding the electric power to the electric heater has exceeded the predetermined period of time.

7. A device for detecting deterioration of a catalytic converter according to claim 1, wherein said electric heater is the one contained in the electrically heated catalyst.

8. A device for detecting deterioration of a catalytic converter according to claim 4, wherein means for detecting the temperature of said catalyst carrier is a catalyst temperature sensor provided for said catalytic converter.

9. A device for detecting deterioration of a catalytic converter according to claim 4, wherein means for detecting the temperature of said catalyst carrier is an engine control unit which executes an estimation calculation to detect the temperature of said catalyst carrier by utilizing the operation condition parameters of said internal combustion engine that are input.

* * * * *